C. PALMER.
R. BRIDEN, RECEIVER IN LUNACY OF SAID PALMER.
CASH REGISTER.
APPLICATION FILED SEPT. 26, 1910.
1,072,769.
Patented Sept. 9, 1913.
2 SHEETS—SHEET 1.
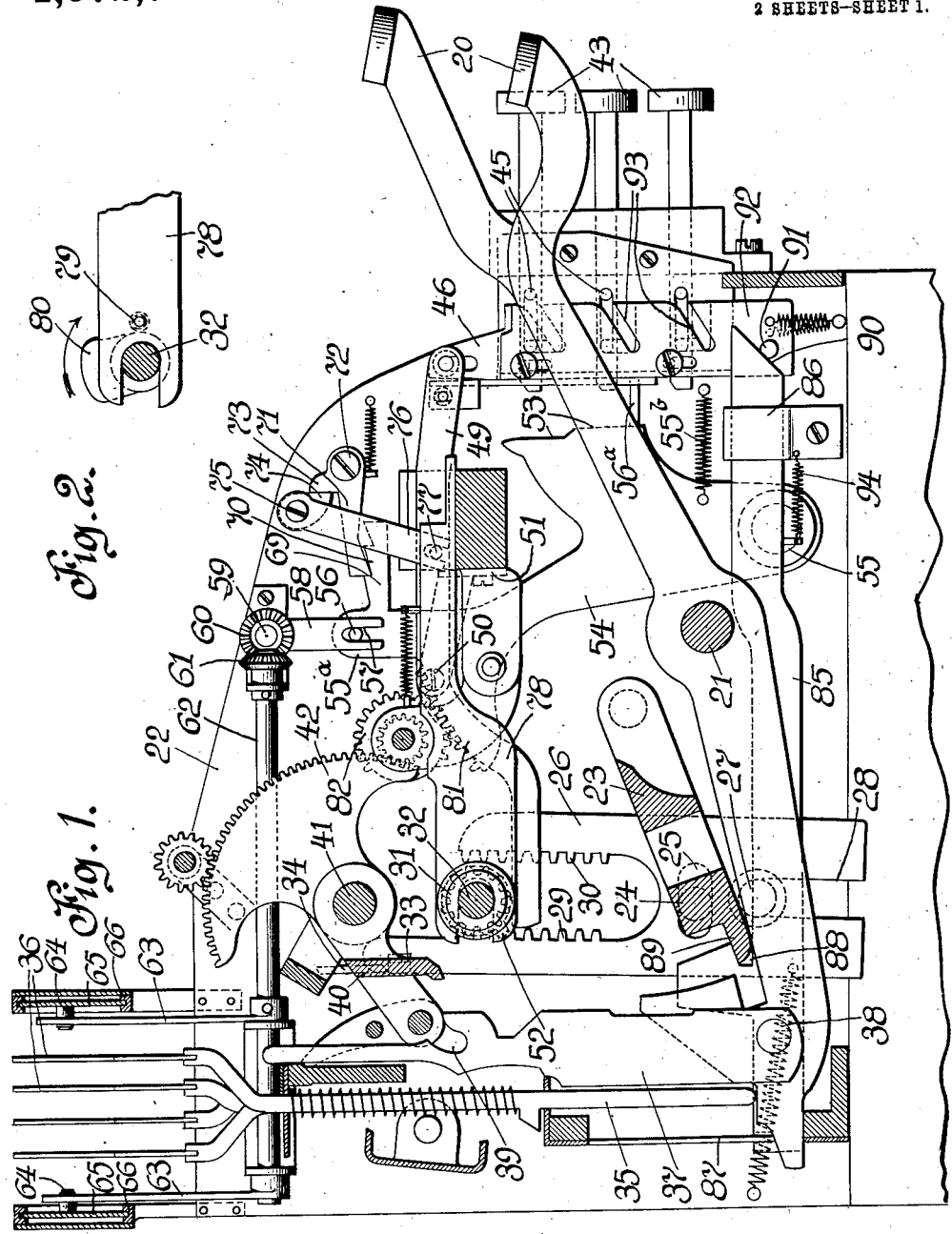

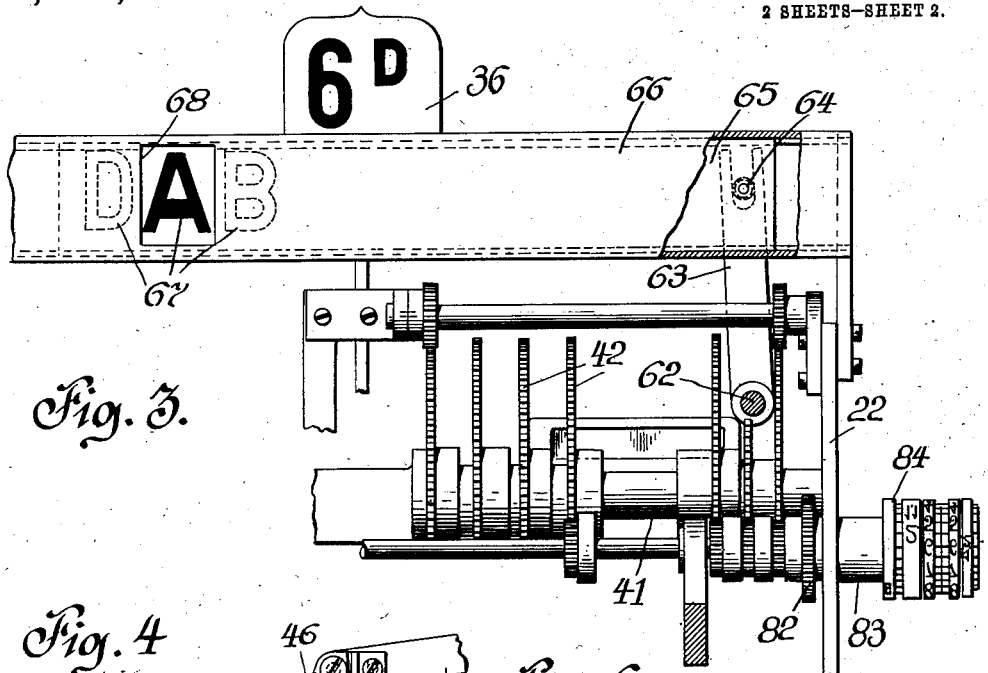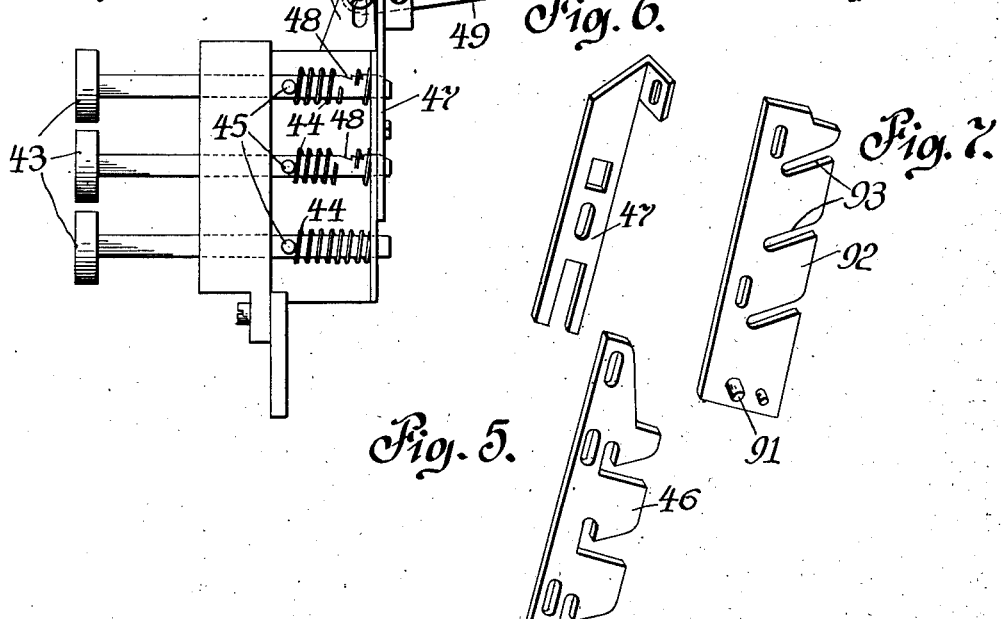

UNITED STATES PATENT OFFICE.

CHARLES PALMER, OF CATFORD, ENGLAND, BY ROBERT BRIDEN, OF LONDON, ENGLAND, RECEIVER IN LUNACY OF SAID PALMER, ASSIGNOR TO GEORGE WILLIAM MARSH AND CHARLES RUNDLE THOMAS, BOTH OF LONDON, ENGLAND.

CASH-REGISTER.

1,072,769.   Specification of Letters Patent.   Patented Sept. 9, 1913.

Application filed September 26, 1910. Serial No. 583,923.

*To all whom it may concern:*

Be it known that I, ROBERT BRIDEN, a subject of the King of Great Britain and Ireland, residing at 51 Chalton street, Euston Road, London, in England, am the receiver in lunacy of CHARLES PALMER, of Catford, county of Kent, England, (as appears by a certified copy of my appointment, which has been recorded in the assignment records of the Patent Office in Liber E 87, page 355,) who has invented certain new and useful Improvements in Cash-Registers, of which I declare the following to be a full, clear, and exact description.

This invention relates to cash registers and has more particular relation to indicating and printing mechanisms for the same.

The invention has been shown as applied to a cash register of the type shown and described in Letters Patent of the United States issued to Thomas Carney on September 6th, 1892, and numbered 482,161, but it will readily be seen that the invention may equally as well be applied to any other form of cash registering machines. In machines of this type it is customary to provide a plurality of operating keys representing different amounts, which keys when depressed serve to enter upon a suitable registering mechanism the amount of the transaction. It has also been customary to provide a recording mechanism whereby a detail record may be kept of each sale for the purpose of verification. It is often found desirable to provide means whereby such detail records may be identified with some particular class of transaction, department, or clerk making the sale.

The primary object of the invention is to provide suitable means for identifying each sale with the particular class of transaction, department, or clerk and the present embodiment is shown as used for three clerks.

Another object is to provide suitable indicating mechanism whereby an identifying mark of the clerk handling the transaction will be exhibited to the customer.

A further object is to provide suitable locking mechanism whereby an operation of the machine in the absence of an operation of one of the clerk's keys is prevented.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Figure 1 is a transverse vertical section of the machine shown in the Carney patent with the present improvements applied thereto. Fig. 2 is a detail view of the operating cam for disabling the latch for holding the indicating and printing mechanisms in adjusted position. Fig. 3 is a front plan view of the improved mechanism also showing the connections from the registering mechanism to the printing mechanism. Fig. 4 is a detail view of the three clerks' keys. Fig. 5 is a detail view of the detent plate for holding the keys in depressed position. Fig. 6 is a detail of the auxiliary locking detent plate. Fig. 7 is a detail view of the cam plate for disabling the latch device for the operating mechanism.

The operation of the machine to which the present improvements are applied is substantially the same as that shown and described in the above mentioned Letters Patent but for convenience may be briefly described as follows: Referring to Fig. 1 the machine comprises a series of operating keys 20 pivotally mounted on a transverse rod 21 hung between the side frames 22. Each key 20 is adapted when operated to raise and lower a main operating or key coupler mechanism 23 of well known form. The key coupler 23 is pivotally mounted in the side frame 22 and extends across the machine above all of the keys 20 just to the rear of the cross rod 21. The coupler 23 is provided at one end with a pin 24 projecting into a transverse slot 25 formed in a vertical bar 26 and through the medium of this connection is adapted to raise and lower said bar 26 at each operation of a key 20. Bar 26 is guided in its movement by a stud 27 mounted on main frame 22 and projecting into a slot 28 formed in the lower end of said bar 26. At its upper end the bar 26 is formed with oppositely facing racks 29 and 30 which alternately engage a pinion 31 mounted on a transverse shaft 32. Rack arm 29 is provided with a lug 33 which is arranged to ride on opposite sides of a flange 34 mounted on the side frame 22 of the machine, and thus hold the respective racks to mesh with the pinion 31. This construction is old and well known in the art, and it will readily be seen that an operation of the key 20 and the consequent reciprocation of key coupler 23 will result in a single rotation of the shaft 32.

Mounted to rest on the rear end of each of the keys 20 are a series of standards 35 each of which carries at its upper end a "flag" 36, of well known form and adapted to indicate the amount registered at an operation of its appropriate key. At an operation of one of the keys 20 its appropriate "flag" 36 will be raised and held in such raised position and expose to view through a sight opening in the cabinet (not shown) the numerals carried thereby. Each of the keys 20 is further provided with an upwardly extending operating arm 37 pivoted to said key at 38 and having at its upward end a notch 39 adapted to engage and operate a registering frame 40 pivotally mounted upon a cross rod 41 hung between the side frames 22 of the machine. This method of operating the registering frame is old and well known in the art, and it is also well known that the keys representing different amounts are provided with arms 37 having the notches 39 graduated to engage the frame 40 at different periods in the regular operation of the machine, so as to give said frame 40 a differential operation dependent upon the particular key operated. Suitable registering mechanism is generally provided, which mechanism may be automatically thrown into and out of engagement with the segments 42 carried by said registering frame 40, so as to record on said register the amount represented by the key 20 which has been operated.

Mounted beside the amount keys 20 at one end of the machine are three depressible clerks' keys 43 normally spring pressed toward their outward position by springs 44 interposed between the frame of the machine and pins 45 carried by said keys. Pins 45 are further adapted to coöperate with a detent plate 46 (Fig. 5) of well known form, which plate 46 is arranged to lock the keys 43 in depressed position. An auxiliary detent plate 47 (Fig. 6) is provided, said plate being arranged to coöperate with notches 48 formed in the upper edges of the keys 43 (see Fig. 4) to lock said keys when partially depressed, thereby preventing the withdrawal of the keys after a partial depression of the same has been made. Plates 46 and 47 are pivoted at their upper ends to a lever 49 which lever 49 is centrally pivoted at 50 to a standard 51 mounted on the frame of the machine. The rear end of lever 49 normally extends under and in the path of a cam 52 carried by the shaft 32 and at the end of each operation of the machine said cam 52 is adapted to engage the lever 49 thereby to raise the forward end of said lever and consequently disengage said plates 46 and 47 from the depressed key 43, thereby permitting said key to assume its normal outward position under the action of its spring 44. When either of the two upper keys 43 is depressed the rear end of said key is adapted to engage the appropriate one of the graduated steps 53 of a differential plate 54 pivotally mounted at 55 on the main frame of the machine, the purpose of the graduated steps being to permit of a graduated movement being given to said differential plate 54. This plate is provided with an upwardly extending arm 55$^a$, which arm carries a pin 56 projecting into a bifurcation 57 formed in an arm 58 pivotally mounted on a stud 59 and rigidly connected to a bevel pinion 60. The bevel pinion 60 is constantly in mesh with a companion bevel pinion 61 rigidly mounted on a rock shaft 62, which rock shaft has rigidly mounted thereon two upwardly extending levers 63 bifurcated at their upper ends to straddle pins 64 carried by a pair of sliding indicator plates 65, one located at the front and the other at the rear of the machine. These indicator plates 65 are adapted to slide in frames 66 located just below the point at which the "flags" 36 are exposed, and said plates 65 bear suitable letters 67 adapted to represent the various clerks using the machine. The plate 65 is adapted to be given any one of three positions of adjustment, and when in any one of such positions is adapted to exhibit at a sight opening 68 formed in the frames 66, the letter appropriate to the key 43 which is depressed.

The lowermost key 43, when depressed, will not engage the differential plate 54 and said plate 54 is held in its position of rest by a spring 55$^b$. When in such position a pin 56$^a$ carried by said plate 54 will rest against the main frame of the machine. For convenience the letter "D" is assigned to the lowermost key 43, and when said key is depressed the plate 54 will remain in normal position and the letter "D" on sliding indicator plate 65 will be exhibited at the sight opening 68. When the uppermost key 43 is depressed the rear end of said key will engage the upper one of the two graduated steps 53, and will rock the plate 54 to an extent sufficient to rock arm 58 and consequently shaft 62 and arm 63, thereby to slide said plate 65 laterally to the left in Fig. 3 to bring the letter "A" to a position to be exposed at the sight opening 68. If the middle key 43 is depressed, the rear end of said key will engage the lower graduated step 53 and thereby give said differential plate 54 a greater throw, to move the plate 65 laterally to an extent sufficient to bring the letter "B" to position to be exposed at the sight opening 68.

In order to maintain the indicator plate 65 in adjusted position between operations of the machine, the plate 54 is provided with a locking arm 69 provided with locking notches 70 coöperating with a locking pawl 71 pivoted at 72 to the frame 22, and having an upwardly extending lug 73 projecting into the path of an arm 74 pivoted at 75 to the frame 22 and rigidly connected to a downwardly extending arm 76. The arm 76 is bifurcated at its lower end to straddle a pin 77 carried by a sliding plate 78, which at its forward end is adapted to slide on a frame of the machine and at its rear end is bifurcated to straddle the rotation shaft 32. The plate 78 carries an anti-friction roller 79 which normally stands in the path of a cam 80 (see Figs. 1 and 2) rigidly mounted on rotation shaft 32. At the beginning of each operation of the machine said cam 80 will engage the anti-friction roller 79 and thereby move the plate 78 to rock the arm 76 and consequently the arm 74 and lug 73, thereby to disengage the locking pawl 71 from the locking notches 70. In this manner the differential plate 54 is released to permit it to move toward normal position under the action of its spring 55ª, provided said plate 54 is not then resting against the rear end of a previously depressed key. If the middle key 43 had been depressed on a previous operation, it will readily be seen that the plate 54 will have been rocked rearward to an extent sufficient to cause the arm 69 to clear the locking pawl 71, and said pawl will have dropped down in front of said arm 69 thereby holding said plate 54 and indicator plate 65 in a position to indicate the letter "B". If the middle or "B" key is again depressed upon a succeeding operation of the machine, it will readily be seen that when the locking pawl 71 is disengaged from the arm 69 at the beginning of said succeeding operation, the plate 54 will not be permitted to move toward normal position as the lowermost graduated step 53 will already be resting against the rear end of said middle key 43. If, however, the uppermost key 43 is depressed, the plate 54 will, when the pawl 71 is disengaged from the arm 69, be permitted to move toward normal position until the uppermost graduated step 53 strikes the rear end of said uppermost key 43. If the lowermost key is depressed upon the succeeding operation of the machine, the plate 54 will then be permitted to drop all the way back toward normal position until the pin 56ª strikes the frame of the machine.

In order to adjust a printing element to a position corresponding to the position of adjustment given to the indicator plate 65, the plate 54 is provided with a segment 81 constantly in engagement with a pinion 82 which pinion 82 is carried by a sleeve 83 having a printing element 84 rigidly mounted on its outer end. The type is so arranged on said printing element 84 that when a key 43 is depressed a letter will be brought to the printing line simultaneously with the adjustment of the corresponding letter of the indicator plate 65 behind the sight opening 68.

In order to prevent an operation of the machine without first depressing one of the keys 43, there is provided a sliding locking plate 85 which is adapted to slide in a guideway 86, and a slot formed in a rear guide plate 87 of the machine. At its rear end the plate 85 is formed with a notch 88 normally engaging a flange 89 of the key coupler 23, thereby preventing the raising and lowering of said coupler by the depression of one of the keys 20. The plate 85 is formed at its forward end with a bevel camming edge 90 adapted to be engaged by a pin 91 carried by a cam plate 92. The cam plate 92 is arranged to slide beside the detent plate 46, and is provided with three cam slots 93 each, of which, is adapted to coöperate with the pin 45 on one of the keys 43. When one of said keys 43 is depressed its pin 45 will engage its appropriate cam slot 93 and, upon a further depression of said key will raise said plate 92 to cause the pin 91 carried thereby to cam the plate 85 rearward, thereby disengaging the notch 88 from the flange 89 of the key coupler 23, to permit of an operation of any one of the keys 20. It will readily be seen that until one of the keys 43 is depressed, the plate 85 will be maintained in normal locking position by spring 94, thereby absolutely preventing an operation of any one of the keys 20 without first depressing a key 43.

In machines of this type it has been found desirable to have the order of the type printing elements arranged so as to print the detail items on the record strip in proper order. In machines of the type to which the present improvements have been applied it is generally found that the type are so arranged that the detail record strip is printed upside down and the items thereon cannot be read at the front of the machine. In Fig. 3 connections have been shown between the registering segments 42 and the printing elements of the printing mechanism, whereby a reversal of said printing elements is obtained, so as to cause a printing of the detail record in proper order so that the record may be examined at any time through any suitable sight opening which may be provided in the cabinet of the machine. This method, however, of reversing the order of printing elements is old and well known in the art and a detailed description of the same will not be given herein.

The general operation of the improved machine is as follows: Before any one of the amount keys 20 representing the amount of the transaction may be depressed, it is necessary to depress the key 43 appropriated to the clerk making the sale. The depression of said appropriated key 43 will result in an adjustment of the indicator plate 65 to exhibit at the sight opening 68 the initial corresponding to the key 43 which has been depressed. Simultaneously with the adjustment of the said indicator plate, an adjustment of the printing element 84 will be obtained, whereby to bring the proper printing type to printing line, so that the letter appropriate to the operator may be printed upon the record strip beside a detailed record of the transaction. Upon the full depression of the key 43, the locking plate 85 will be moved to unlock the key coupler 23 and any one of the keys 20 may then be depressed. Upon the completion of the operation of the keys 20, the depressed keys 43 will be released and the indicator 65 and the printing element 84 will be locked in adjusted position, thereby exhibiting the appropriate letter on said indicator plate at the sight opening 68 so as to identify the indication represented by the raised indicator "flags" 36 with some particular clerk or operator.

While the form of mechanism herein shown and described is admirably adapted to fulfil the objects primarily stated it is to be understood that it is not intended to confine the invention to the one form of embodiment herein shown and described as it is susceptible of embodiment in various forms all coming within the scope of the claims which follow.

What is claimed is:

1. In a cash register, the combination with vertically adjustable amount indicators and keys for setting the same, of a laterally shiftable indicating mechanism having a plurality of indicating positions, a series of clerks' keys, and means differentially controlled by said clerks' keys for shifting said indicator to its various indicating positions.

2. In a cash register, the combination with a main operating mechanism, of a laterally shiftable indicating mechanism having a plurality of indicating positions, a series of keys, means differentially controlled by said keys for shifting said indicator to its various indicating positions, and means for locking said operating mechanism until one of said keys has been operated.

3. In a cash register, the combination with a main operating mechanism, of a laterally shiftable indicating mechanism having a plurality of indicating positions, a series of keys, means differentially controlled by said keys for shifting said indicator to its various indicating positions, a locking device for normally locking said operating means, means operated upon an operation of one of said keys for simultaneously disabling said locking device and locking the unoperated keys, and means compelling the complete operation of any key.

4. In a machine of the class described, the combination with a series of amount keys, of vertically movable indicators actuated thereby, a series of depressible special keys, a laterally movable indicator differentially adjusted under the control of said special keys, devices for latching the special indicator in its adjusted position, means normally locking the amount keys from operation, mechanism actuated by the special keys for disabling said locking means, a detent for latching the special keys in depressed positions, and means actuated by the amount keys for operating the latching devices for the special indicator and the latching detent for the special keys.

5. In a cash register, the combination with a plurality of amount keys, of a key coupler actuated thereby, a series of special keys and locking means controlled by the depression of one of said special keys for normally locking said key coupler against movement, said locking means comprising a sliding plate having a locking notch normally engaging said coupler, and a cam plate actuated by the depression of any one of said special keys for moving the sliding plate to disengage said notch from the coupler.

6. In a cash register, the combination with a plurality of amount keys, of a key coupler actuated thereby, a series of special keys and locking means controlled by the depression of one of said special keys for normally locking said key coupler against movement, said locking means comprising a sliding plate having a locking notch normally engaging said coupler and a camming edge, a cam plate actuated by the depression of any one of said special keys and carrying a pin for engaging said camming edge to move the sliding plate to disengage its notch from the coupler.

7. In a machine of the class described, the combination with a plurality of amount keys, of means normally locking said keys, a series of depressible special keys, mechanism controlled by the latter keys for operating the locking means for the amount keys, independent devices for latching the special keys in their partially depressed and in their fully depressed positions, and operating means for said latching devices actuated upon the operation of any of the amount keys.

8. In a machine of the class described, the combination with a plurality of amount keys, of a movable member common thereto, means normally locking said member and thereby the amount keys, a series of depressible special keys, mechanism actuated by the latter keys for operating the aforesaid locking means, independent devices for latching the special keys in their partially depressed and in their fully depressed positions, and a common operating means for said latching devices actuated upon the operation of any of the amount keys.

In witness whereof I have signed this specification in the presence of two witnesses.

ROBERT BRIDEN,
*Receiver in lunacy of Charles Palmer.*

Witnesses:
A. J. HADDON,
A. E. HATHAWAY.